(12) United States Patent
Boyer et al.

(10) Patent No.: US 9,279,393 B2
(45) Date of Patent: Mar. 8, 2016

(54) DEVICES AND METHODS FOR EXHAUST GAS RECIRCULATION OPERATION OF AN ENGINE

(71) Applicant: Ford Global Technologies, LLC, Dearborn, MI (US)

(72) Inventors: Brad Alan Boyer, Canton, MI (US); Eric Warren Curtis, Milan, MI (US); Kim Hwe Ku, West Bloomfield, MI (US); Gregory Patrick McConville, Ann Arbor, MI (US); James Douglas Ervin, Novi, MI (US); Daniel Joseph Styles, Canton, MI (US); Joseph Norman Ulrey, Dearborn, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 13/744,281

(22) Filed: Jan. 17, 2013

(65) Prior Publication Data

US 2014/0196703 A1 Jul. 17, 2014

(51) Int. Cl.
*F02D 13/02* (2006.01)
*F02M 25/07* (2006.01)
(Continued)

(52) U.S. Cl.
CPC ........... *F02M 25/07* (2013.01); *F02D 13/0242* (2013.01); *F02D 13/0257* (2013.01); *F02M 25/0717* (2013.01); *F02M 25/0751* (2013.01);
(Continued)

(58) Field of Classification Search
CPC ............. F02M 25/07; F02M 25/0706; F02M 25/0707; F02M 25/0712; F02M 25/0715; F02M 25/0717; F02M 25/0751; F02D 13/0242; F02D 13/0257; F02D 13/0246; F02D 13/0249; F02D 2021/083; F02D 41/0055; F02D 41/008
USPC .............................. 123/568.21, 568.11, 90.15
See application file for complete search history.

(56) References Cited

U.S. PATENT DOCUMENTS 4,313,415 A * 2/1982 Shinzawa ................. 123/568.15
5,279,515 A 1/1994 Moore et al.
(Continued)

FOREIGN PATENT DOCUMENTS

WO 2014005127 A2 1/2014

OTHER PUBLICATIONS

Glugla, Chris P., "Systems and Methods for Boost Control," U.S. Appl. No. 14/307,165, filed Jun. 17, 2014, 56 pages.
(Continued)

*Primary Examiner* — Lindsay Low
*Assistant Examiner* — George Jin
(74) *Attorney, Agent, or Firm* — Julia Voutyras; Alleman Hall McCoy Russell & Tuttle LLP

(57) ABSTRACT

An engine is provided that includes an exhaust gas recirculation (EGR) conduit in fluidic communication with a first exhaust valve in a cylinder and an intake system, an exhaust conduit in fluidic communication with a second exhaust valve in the cylinder and an emission control device. During operation with the first valve active and the second valve deactivated, a fixed EGR level can be provided. However, during operation with the first valve deactivated and the second valve active, increased engine output can be achieved with reduced EGR without requiring additional exhaust throttling or switching valves.

4 Claims, 6 Drawing Sheets

(51) Int. Cl.
*F02B 47/08* (2006.01)
*F02D 21/08* (2006.01)
*F02D 41/00* (2006.01)

(52) U.S. Cl.
CPC ............. *F02B 47/08* (2013.01); *F02D 13/0246* (2013.01); *F02D 41/0055* (2013.01); *F02D 2021/083* (2013.01); *F02M 25/0707* (2013.01); *Y02T 10/121* (2013.01)

(56) References Cited

U.S. PATENT DOCUMENTS

| | | | |
|---|---|---|---|
| 5,746,189 | A | 5/1998 | Kuzuya et al. |
| 6,053,154 | A | 4/2000 | Pott |
| 6,138,650 | A | 10/2000 | Bailey |
| 6,230,695 | B1 | 5/2001 | Coleman et al. |
| 6,293,246 | B1 | 9/2001 | Tanahashi et al. |
| 6,397,790 | B1 | 6/2002 | Collier, Jr. |
| 6,405,720 | B1 | 6/2002 | Collier, Jr. |
| 6,499,449 | B2 | 12/2002 | Michelini et al. |
| 6,543,230 | B1 | 4/2003 | Schmid |
| 6,655,324 | B2 | 12/2003 | Cohn et al. |
| 6,820,415 | B2 | 11/2004 | Abet et al. |
| 6,925,802 | B2 | 8/2005 | Arnold |
| 6,968,825 | B2 | 11/2005 | Hitomi et al. |
| 7,213,566 | B1 * | 5/2007 | Jankovic et al. ............. 123/302 |
| 7,290,504 | B2 | 11/2007 | Lange |
| 7,779,812 | B2 | 8/2010 | Leone et al. |
| 7,870,841 | B2 * | 1/2011 | Methley ..................... 123/90.16 |
| 7,942,127 | B2 | 5/2011 | Leone et al. |
| 8,041,500 | B2 | 10/2011 | Leone |
| 8,108,125 | B2 | 1/2012 | Leone |
| 8,150,605 | B2 | 4/2012 | Doering et al. |
| 8,239,122 | B2 | 8/2012 | Leone et al. |
| 8,291,891 | B2 | 10/2012 | Alger, II et al. |
| 8,352,160 | B2 | 1/2013 | Leone |
| 8,352,164 | B2 | 1/2013 | Leone et al. |
| 8,511,084 | B2 | 8/2013 | Ulrey et al. |
| 8,539,768 | B2 | 9/2013 | Hayman et al. |
| 8,561,599 | B2 | 10/2013 | Gingrich et al. |
| 8,701,409 | B2 * | 4/2014 | Pursifull et al. ............. 60/605.2 |
| 8,763,570 | B2 | 7/2014 | Hayman et al. |
| 2003/0164163 | A1 * | 9/2003 | Lei et al. ................. 123/568.14 |
| 2005/0016496 | A1 | 1/2005 | Hitomi et al. |
| 2005/0022755 | A1 * | 2/2005 | Hitomi et al. ................ 123/58.8 |
| 2009/0287397 | A1 * | 11/2009 | Massard et al. ............... 701/105 |
| 2009/0308070 | A1 * | 12/2009 | Alger et al. ..................... 60/602 |
| 2010/0116255 | A1 * | 5/2010 | Hatamura ..................... 123/564 |
| 2011/0041495 | A1 | 2/2011 | Yager |
| 2011/0132296 | A1 * | 6/2011 | Kuhlbach ............... 123/41.82 R |
| 2011/0162608 | A1 * | 7/2011 | Riegger et al. ............. 123/90.32 |
| 2011/0253113 | A1 | 10/2011 | Roth et al. |
| 2011/0265762 | A1 * | 11/2011 | Lorenz et al. ............ 123/406.45 |
| 2012/0023937 | A1 | 2/2012 | Styles et al. |
| 2012/0078492 | A1 | 3/2012 | Freund et al. |
| 2012/0204844 | A1 * | 8/2012 | Gingrich et al. ......... 123/568.11 |
| 2012/0260897 | A1 | 10/2012 | Hayman et al. |
| 2012/0285163 | A1 | 11/2012 | Hayman et al. |
| 2012/0285426 | A1 | 11/2012 | Hayman et al. |
| 2012/0285427 | A1 | 11/2012 | Hayman et al. |
| 2013/0030672 | A1 * | 1/2013 | Klingbeil ............ F02D 41/0085 701/109 |
| 2013/0340728 | A1 * | 12/2013 | Keating ................... 123/568.11 |

OTHER PUBLICATIONS

Martin, Douglas R. et al., "Method and System for EGR Control," U.S. Appl. No. 14/327,379, filed Jul. 9, 2014, 48 pages.

Ulrey, Joseph N. et al., "Dedicated EGR Cylinder Post combustion Injection," U.S. Appl. No. 13/915,445, filed Jun. 11, 2013, 34 pages.

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

Alger, Terry et al., "Dedicated EGR: A New Concept in High Efficiency Engines," SAE Technical Paper Series No. 2009-01-0694, Southwest Research Institute, 12 pages.

Ulrey, Joseph N. et al., "Dedicated EGR Cylinder Post Combustion Injection," U.S. Appl. No. 13/915,245, filed Jun. 11, 2013, 34 pages.

Leone, Thomas G. et al., "Systems and Methods for Dedicated EGR Cylinder Valve Control," U.S. Appl. No. 14/297,232, filed Jun. 5, 2014, 36 pages.

Leone, Thomas G. et al., "Systems and Methods for EGR Control," U.S. Appl. No. 14/298,733, filed Jun. 6, 2014, 45 pages.

Leone, Thomas G. et al., "Systems and Methods for Improving Operation of a Highly Dilute Engine," U.S. Appl. No. 14/271,248, filed May 6, 2014, 40 pages.

\* cited by examiner

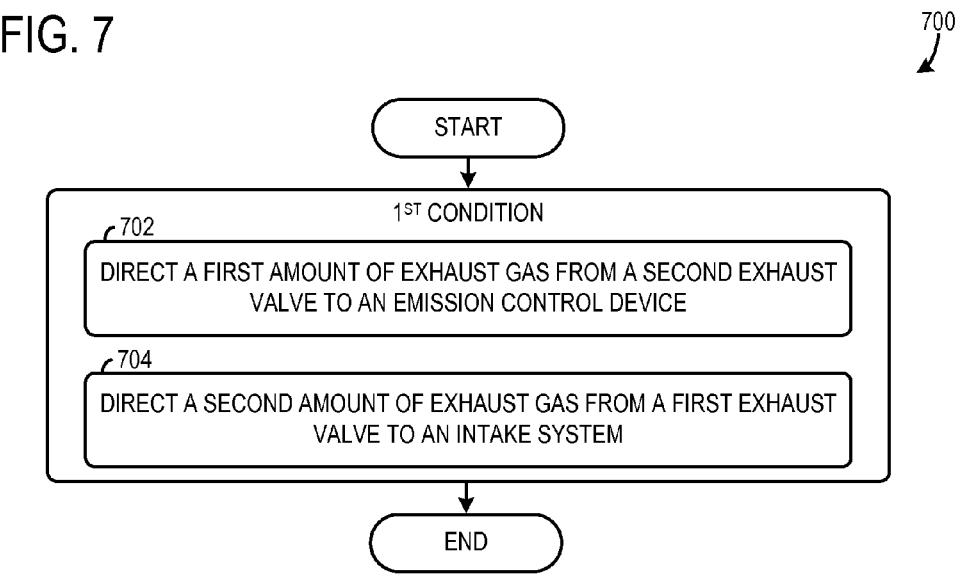

DEVICES AND METHODS FOR EXHAUST GAS RECIRCULATION OPERATION OF AN ENGINE

FIELD

The present disclosure relates to an engine having valve adjustment devices for altering the flow of exhaust gas from a cylinder selectively to each of an exhaust gas recirculation conduit and an exhaust system.

BACKGROUND AND SUMMARY

Exhaust gas recirculation (EGR) may be used in engines to decrease emissions (e.g., nitrogen oxide emissions), improve knock tolerances, improve combustion efficiency, and reduce throttling losses. EGR may be employed in engines utilizing compression or spark ignition. EGR system may flow exhaust gas from one or more of the cylinders in the engine to the engine's intake system via an EGR conduit. EGR valves may be disposed in EGR conduits to regulate exhaust gas flow through the conduits.

US 2012/0260897 discloses an EGR system having two dedicated EGR cylinders, each cylinder having two exhaust valves configured to flow exhaust gas to an EGR conduit or an exhaust treatment device in the exhaust system based on the configuration of valve assemblies positioned in conduits coupling the cylinders to the EGR and exhaust system. Specifically, the EGR system employs three external valve assemblies to regulate the exhaust flow to the EGR system and the exhaust system.

The Inventors have recognized several drawbacks with the EGR system disclosed in US 2012/0260897. For example, the valve assemblies may be susceptible to thermal degradation from the high temperature exhaust gases flowing therethrough. Additionally, the EGR valves may be costly, thereby increasing the engine's cost. Moreover, the valve assemblies may increase losses in the EGR conduit as well as the exhaust system, while the exhaust conduits themselves decrease the compactness of the engine.

The inventors herein have recognized the above issues and developed an engine that includes an exhaust gas recirculation (EGR) conduit in fluidic communication between a first exhaust valve in a cylinder and an intake system, and an exhaust conduit in fluidic communication between a second exhaust valve in the cylinder and an emission control device. The engine may further include a valve adjustment system, such as a first cam profile (CPS) system, to selectively activate the first exhaust valve and the second exhaust valve.

In this way, the valve adjustment system may be used to adjust the amount of EGR delivered to the intake system and the amount of exhaust gas delivered to the exhaust system from a single cylinder via dedicated cylinder valves and conduits. As a result, combustion efficiency may be improved and emission (e.g., nitrogen oxide emissions) may be reduced, without a complicated network of exhaust throttles (although exhaust throttles could be added, if desired).

In one example, a first CPS device activates valve operation of the first exhaust valve during a first condition and inhibits valve operation of the first exhaust valve during a second condition. Additionally, a second CPS device activates valve operation of the second exhaust valve during the second condition and inhibits valve operation of the second exhaust valve during the first operating condition. In this way, substantially all of the exhaust gas from the cylinder may be flowed to the EGR conduit during the first condition and flowed to the emission control device during the second condition. The first condition may be when the engine is below a threshold temperature. As a result, the emission control device may reach a light-off temperature more quickly. The first condition may also allow for improved peak engine performance by diverting the exhaust enthalpy of that cylinder to the turbocharger turbine. In the second condition, the exhaust from that cylinder is routed to the intake manifold as EGR, improving fuel economy via improved combustion efficiency, reduced pumping losses and reduced knock tendency. In an alternative embodiment, a single cam switching device can control activation/deactivation of both the first and second valves, together.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 3 is drawn approximately to scale, however other relative dimensions may be used if desired;

FIG. 4 is drawn approximately to scale, however other relative dimensions may be used if desired; and FIGS. 5-7 show various methods for operation of an engine.

DETAILED DESCRIPTION

An engine is described herein. The engine may include a valve adjusting device configured to permit and inhibit exhaust gas flow from a cylinder to an exhaust gas recirculation (EGR) conduit and from the cylinder to the exhaust system. For example, a first exhaust valve in the cylinder (coupled to an EGR passage leading to the engine intake) may be active during some conditions while a second exhaust valve in the cylinder (coupled to the exhaust of other cylinders) may be active during other conditions. In this way, valve activation/deactivation during engine combustion cycles may be used to adjust the flow of exhaust gas to dedicated EGR and exhaust conduits. For example, substantially all of the exhaust gases in the cylinder may flow to either the EGR conduit (and not the exhaust system), or the exhaust system (and not the EGR conduit) under different conditions, thereby utilizing the exhaust gases of that cylinder for improved fuel economy or exhaust aftertreatment light-off and peak performance as desired. Therefore, the EGR conduit may not include an EGR valve in one example, if desired. As a result, the cost of the engine may be reduced. Additionally, the exhaust valves may not be equivalent in size in one example, to provide different degrees of exhaust gas flow to the EGR and exhaust conduits, to improve EGR and non-EGR operation by providing desired exhaust gas flowrates to the EGR and exhaust systems.

Figure 1:
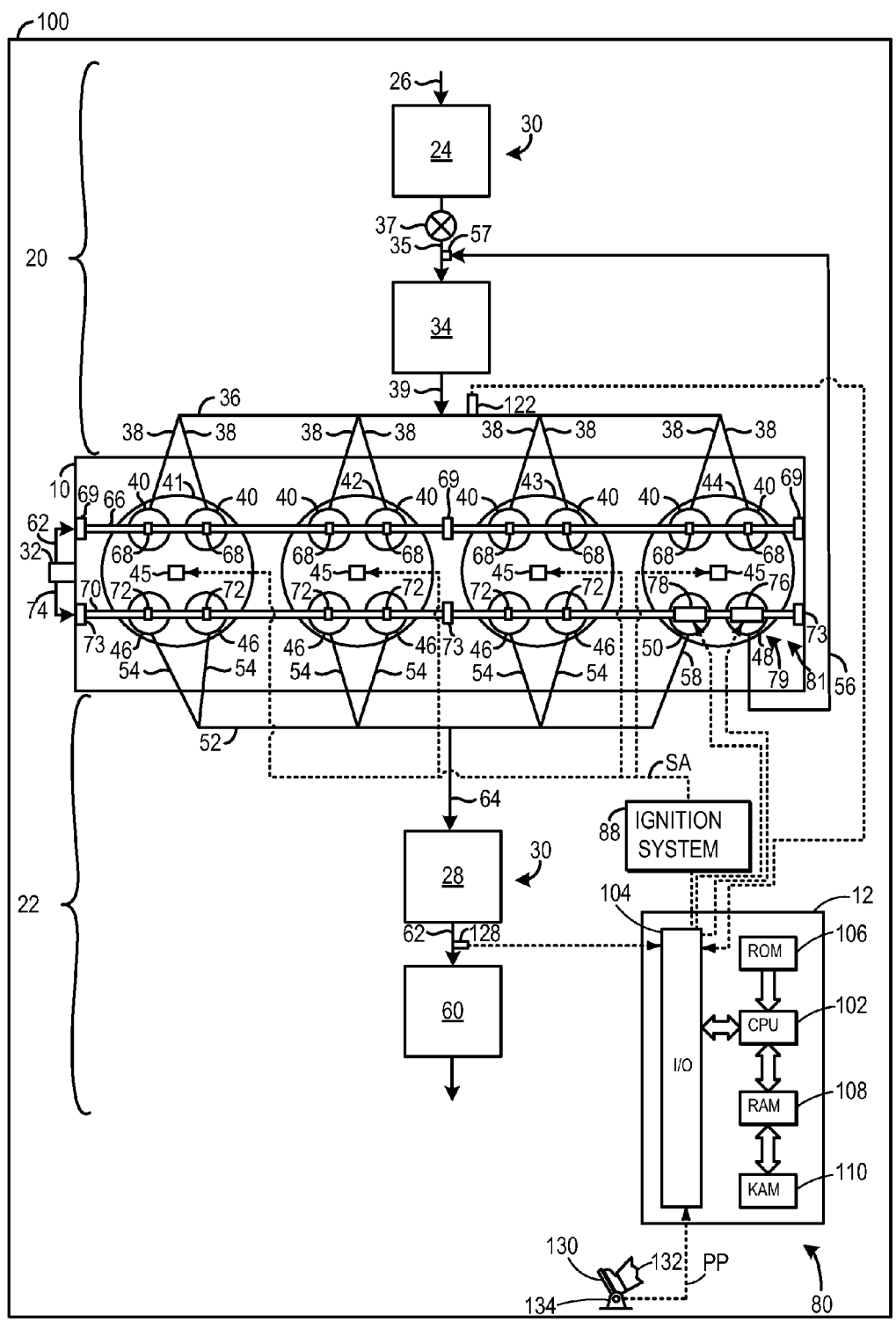
FIG. 1 shows a schematic depiction of an engine.

FIG. 1 shows a schematic diagram of an internal combustion engine 10 included in a propulsion system of a vehicle 100. The engine 10 may be controlled at least partially by a control system 80 including controller 12 and by input from a vehicle operator 132 via an input device 130. In this example, input device 130 includes an accelerator pedal and a pedal position sensor 134 for generating a proportional pedal position signal PP.

An intake system 20 and an exhaust system 22 are also included in the vehicle 100. The intake system 20 and the exhaust system 22 are depicted as being separate from the engine 10. However, it will be appreciated that the intake and/or exhaust systems or portions of these systems may be integrated into the engine, in some examples.

The intake system 20 is configured to provide the engine 10 with intake air. The intake system 20 includes a compressor 24 configured to increase the pressure and therefore the mass of the intake air. In this way, boosted air may be supplied to the engine 10 to increase combustion efficiency and/or output, if desired. In one example, the compressor may be a variable geometry compressor. However, in other examples the geometry of the rotor vanes may be fixed. Arrow 26 denotes the flow of intake air into the compressor 24. Further in other examples, the compressor 24 may not be included in the vehicle 100. Therefore, in some examples the engine 10 may be naturally aspirated. The compressor 24 may be rotationally coupled to a turbine 28 in the exhaust system 22, discussed in greater detail herein. The compressor 24 and the turbine 28 may be included in a turbocharger 30. The compressor 24 and the turbine 28 may be mechanically coupled via a drive shaft (not shown) and/or other suitable mechanical linkage. However, in other examples, the compressor 24 may be rotationally coupled to a crankshaft 32, to provide what is commonly referred to as supercharging to the engine.

Intake air may be supplied to the compressor 24 via an air intake which may include an air filter, in some examples. The compressor 24 is in fluidic communication with a charge air cooler 34 configured to remove heat from the intake air flowing therethrough. The heat removed from the intake air may be transferred to the surrounding environment, in some examples. An intake conduit, denoted via arrow 35, enables fluidic communication between the compressor 24 and the charge air cooler 34. Arrow 39 denotes the fluidic communication between the charge air cooler 34 and an intake manifold 36 via an intake conduit.

A throttle 37 is coupled to the intake conduit 35. The throttle 37 is configured to adjust the amount of airflow through the intake conduit 35. The throttle 37 is positioned downstream of the compressor 24 and upstream of the charger air cooler 34. However, other suitable throttle positions have been contemplated, such as downstream of the charger air cooler 34.

The charge air cooler 34 may be sized to achieve a desired amount of heat removal from the intake air. Thus, the charge air cooler 34 acts as a heat exchanger. In some examples, the charge air cooler 34 may be sized to provide a desired amount of cooling to EGR gas.

The intake system 20 further includes an intake manifold 36 and intake runners 38. In some examples, the intake manifold 36 and/or intake runners 38 may be integrated into the engine 10. The intake manifold 36 is in fluidic communication with the charge air cooler 34. The intake runners 38 are in fluidic communication with intake valves 40 in the engine 10. The intake valves 40 are included in or coupled to cylinders (41, 42, 43, and 44) in the engine 10. The intake valves 40 are configured to open and close to enable and inhibit intake air flow from the intake runners 38 to the cylinders (41, 42, 43, and 44). The intake valves 40 may for example be poppet valves.

The engine 10 is depicted as having four cylinders (41, 42, 43, and 44) in an inline configuration in which a plane extend through the centerline of each of the cylinders. However, other cylinder configurations have been contemplated. In the depicted example, each cylinder in the engine 10 includes two intake valves. However, an engine with an alternate number of intake valves per cylinder has been contemplated. Additionally, an intake runner is provided for each intake valve.

Ignition system 88 can provide an ignition spark to cylinders (41, 42, 43, and/or 44) via ignition devices 45 (e.g., spark plugs) in response to spark advance signal SA from controller 12, under select operating modes. Though spark ignition components are shown, in some examples, cylinders (41, 42, 43, and/or 44) of engine 10 may be operated in a compression ignition mode, with or without an ignition spark.

The engine 10 may further include a fuel delivery system. The fuel delivery system may include fuel injectors directly coupled to each of the cylinders, providing what is referred to as direct fuel injection. Additionally or alternatively, a plurality of fuel injectors may be positioned upstream of the intake valves 40 providing what is referred to as port fuel injection. The fuel delivery system may include a fuel tank, a fuel pump including a pick-up tube positioned in the fuel tank. The fuel injector may be in fluidic communication with the fuel injectors.

The cylinders (41, 42, and 43) may each include two exhaust valves 46. Each of the exhaust valves 46 may be opened and closed to enable and inhibit exhaust gas flow from the cylinders (41, 42, and 43) to the exhaust system 22. However, cylinders with alternate number of exhaust valves have been contemplated. The exhaust valve in the cylinders (41, 42, and 43) may be substantially identical in size and functionality. However, the size and functionality of the exhaust valves 46 may vary, in other examples. The exhaust valves 46 are in fluidic communication with an exhaust manifold 52. Exhaust runners 54 are in fluidic communication with the exhaust valves 46 and the exhaust manifold 52. The exhaust runners 54 are types of exhaust conduits. However, in other examples another type of exhaust conduit may enable fluidic communication between the exhaust valves and the exhaust manifold.

The cylinder 44 includes a first exhaust valve 48 and a second exhaust valve 50. In one example, the first exhaust valve 48 may not be equivalent in size to the second exhaust valve 50. Specifically, the first exhaust valve 48 may be smaller than the second exhaust valve 50. The first exhaust valve 48 is in fluidic communication with the intake system 20. An EGR conduit 56 provides the fluidic communication between the first exhaust valve 48 and the intake system 20. Thus, the EGR conduit 56 is in fluidic communication between the first exhaust valve and the intake system. The EGR conduit 56 includes an outlet 57 opening into the intake conduit 35. Thus, the EGR conduit 56 flows EGR gas into the intake system 20 at a location downstream of the compressor 24 and upstream of the charger air cooler 34. In this way, the charger air cooler 34 may provide cooling to the boosted air from the compressor 24 as well as the EGR gas. The charger air cooler 34 may be sized to accommodate for a desired amount of cooling of the two flow paths.

In one example, the EGR conduit 56 may be coupled only between the first exhaust valve 48 and the intake system 20, the EGR conduit coupled to the intake system at a location upstream of all cylinders of the engine. Further in one example, the EGR conduit 56 may not be coupled to exhaust valves of any other cylinder of the engine. In one example, the EGR conduit 56 may be unobstructed by an adjustable valve between the first exhaust valve and the intake system.

The cylinder 44 may be referred to as an EGR cylinder and the cylinders (41, 42, and 43) may be referred to as non-EGR cylinders, in one example. The second exhaust valve 50 is in fluidic communication with the exhaust manifold 52. In this way, exhaust flow from the cylinder (41, 42, 43, and 44) may merge into a single exhaust stream in the exhaust manifold, during some operating conditions.

An exhaust conduit 58 provides fluidic communication between the second exhaust valve 50 and the exhaust manifold 52. Thus, the exhaust conduit 58 is in fluidic communication between the second exhaust valve 50 in the cylinder and an emission control device 60. In this way, the second exhaust valve 50 is in fluidic communication with the turbine 28 and an emission control device 60 positioned downstream of the turbine 28 in the exhaust system 22. The exhaust conduit 58 is fluidly separated from the EGR conduit 56. The emission control device 60 may be a three way catalyst (TWC), NOx trap, various other emission control devices, or combinations thereof. In some examples, the emission control device 60 may be a first of a plurality of emission control devices positioned in the exhaust system. In some examples, during operation of engine 10, emission control device 60 may be periodically reset by operating at least one cylinder of the engine within a particular air/fuel ratio. An exhaust conduit, denoted via arrow 62, enables fluidic communication between the turbine 28 and the emission control device 60. An exhaust conduit, denoted via arrow 64, enables fluidic communication between the exhaust manifold 52 and the turbine 28.

The engine 10 may further include an intake camshaft 66. Additionally or alternatively, electronic valve actuation may be used to actuate at least some of the intake valves in the engine. The intake camshaft 66 includes a plurality of intake cam lobes 68 configured to cyclically actuate the intake valves 40. The intake camshaft 66 is mechanically coupled to the crankshaft 32, denoted via arrow 62. The crankshaft 32 may be mechanically coupled to pistons (not shown) disposed in the cylinders (41, 42, 43, and 44). Bearings 69 are configured to support the intake camshaft 66 and facilitate rotation of the intake camshaft.

The engine may further include an exhaust camshaft 70. The exhaust camshaft 70 includes a plurality of exhaust cam lobes 72 configured to cyclically actuate the exhaust valves 46. Specifically in the depicted example, one cam is provided for each of the exhaust valves 46. However, other cam configurations and arrangements have been contemplated for the exhaust valves 46. Bearings 73 are configured to support the exhaust camshaft 70 and facilitate rotation of the exhaust camshaft. The exhaust camshaft 70 is mechanically coupled to the crankshaft 32, denoted via arrow 74. Variable cam timing may be used in the engine 10, if desired.

The exhaust camshaft 70 further includes a plurality of cams associated with the cylinder 44. The exhaust cams corresponding to the cylinder 44 may be included in a first CPS device 76 and a second CPS device 78. The first CPS device 76 and the second CPS device 78 may be included in a deactivation mechanism 79 in a valve adjustment system 81. It will be appreciated that valve adjustment systems having additional or alternate suitable components have been contemplated.

It will be appreciated that the valve adjustment system 81 may be included in the engine 10. The valve adjustment system 81 may be coupled to the first and second exhaust valves (48 and 50) of the cylinder 44 and is configured to actuate and deactivate the valves.

The first CPS device 76 is coupled or integrated into the first exhaust valve 48. Likewise, a second CPS device 78 is coupled or integrated into the second exhaust valve 50. The first CPS device 76 is configured to selectively activate and inhibit cyclical actuation of the first exhaust valve 48. Likewise, the second CPS device 78 is configured to selectively activate and inhibit cyclical actuation of the second exhaust valve 50. In this way, the CPS device may selectively activate valve operation in their respective exhaust valves. The control system 80 and specifically the controller 12 are in electronic communication with the first CPS device 76 and the second CPS device 78. However, in other examples a CPS controller may be configured to adjust operation of the CPS devices.

As shown, the EGR conduit 56 does not include an EGR valve or an EGR cooler. It will be appreciated that the second CPS device 78 enables adjustment in the exhaust gas flow through the EGR conduit. Thus, the second CPS device 78 provides the functionality of an EGR valve. However, in other examples at least one of an EGR valve and an EGR cooler may be coupled to the EGR conduit 56.

The controller 12 is shown in electronic communication with the first CPS device 76 and the second CPS device 78. Additionally, the first CPS device 76 and the second CPS device 78 may be included in and/or coupled to the control system 80.

In one example, the control system 80 may be configured to during a first operating condition, activate cyclical actuation of the first exhaust valve to flow exhaust gas from the cylinder to the EGR conduit via the first CPS device and during a second operating condition, activate cyclical actuation of the second exhaust valve to flow exhaust gas from the cylinder to the exhaust conduit via the second CPS device.

Exhaust gas sensor 128 is shown coupled to the exhaust passage 62 of the exhaust system 22 upstream of emission control device 60. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some examples, exhaust gas sensor 126 may be a first one of a plurality of exhaust gas sensors positioned in the exhaust system. For example, additional exhaust gas sensors may be positioned downstream of emission control device 60.

Controller 12 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 12 may receive various signals from sensors included in the engine 10 such as an absolute manifold pressure signal, MAP, from sensor 122. It will be appreciated that in other examples the controller 12 may receive signals from additional sensors such as a throttle position sensor, an engine temperature sensor, an engine speed sensor, air/fuel sensor, etc.

During operation, each of the cylinders (41, 42, 43, and 44) in the engine 10 typically undergoes a four stroke cycle: the cycle includes the intake stroke, compression stroke, expansion stroke, and exhaust stroke. During the intake stroke, generally, exhaust valves close and intake valves open. Air is introduced into a cylinder via the intake manifold, for example, and a piston moves to the bottom of the combustion chamber so as to increase the volume within the cylinder. The position at which the piston is near the bottom of the combustion chamber and at the end of its stroke (e.g. when the cylinder is at its largest volume) is typically referred to by those of skill in the art as bottom dead center (BDC). During the compression stroke, intake valves and exhaust valves are closed. The piston moves toward the cylinder head so as to compress the air within the cylinder. The point at which the piston is at the end of its stroke and closest to the cylinder head (e.g. when the cylinder is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as a spark plug, resulting in combustion. Additionally or alternatively compression may be used to ignite the air/fuel mixture. During the expansion stroke, the expanding gases push the piston back to BDC. A crankshaft may convert piston movement into a rotational torque of the rotary shaft. Finally, during the exhaust stroke, exhaust valves open to release the combusted air-fuel mixture to an exhaust manifold and the piston returns to TDC. In the case of cylinder 44 only one of the exhaust valves in the cylinder may open during the exhaust stroke, in some examples. Note that the above is described merely as an example, and that intake and exhaust valve opening and/or closing timings may vary, such as to provide positive or negative valve overlap, late intake valve closing, or various other examples. Additionally or alternatively compression ignition may be implemented in one or more of the cylinders (41, 42, 43, and 44).

Figure 2:
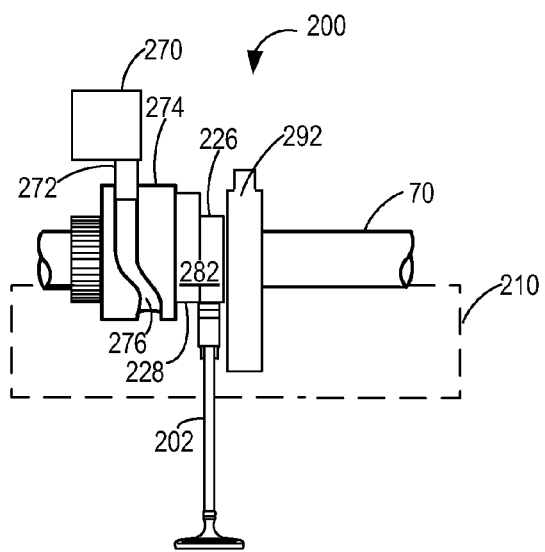
FIG. 2 shows an example exhaust valve and cam profile switching (CPS) device which may be included in the engine shown in FIG. 1.

FIG. 2 shows an example CPS device 200. The CPS device 200 may be one of the CPS devices (76 and 78) shown in FIG. 1. The CPS device 200 may activate or deactivate an exhaust valve 202 depending on engine operating conditions. For example, as described in more detail below, by adjusting cylinder cam mechanisms, the valve 202 may be operated with or without valve lift based on engine operating conditions. In other examples, the exhaust valve 202 may be operable in multiple different valve lift modes, e.g., a high valve lift, low valve lift, and zero valve lift, rather than being activated or deactivated. The exhaust valve 202 may be either exhaust valve 48 or exhaust valve 50, shown in FIG. 1.

The CPS device 200 includes a mechanism 282 coupled to the camshaft 70 for adjusting an amount of valve lift for that valve and/or for deactivating that valve. In the example depicted in FIG. 2, the mechanism 282 includes two different lift profile cams: no-lift cam lobe 226 and lift cam lobe 228. However, it will be understood that the mechanisms may include addition lift profiles without departing from the scope of this disclosure (e.g., a high lift cam, a low lift cam, and a no-lift cam). It will be appreciated that the lift profiles of the lift cam lobe 228 may vary between CPS devices (76 and 78) in one example. In this way, selected amounts of exhaust gas may be flowed to the EGR system and exhaust system when desired.

The CPS device 200 may control the exhaust camshaft 70 to activate and deactivate engine cylinders via contact between a pin 272 coupled with a solenoid 270 and a shuttle 274. As shown, a snaking groove 276 may traverse a circumference of the shuttle, such that movement of the pin in the groove may affect axial movement of the shuttle along the camshaft. That is, the CPS device 200 may be configured to translate specific portions of the camshaft longitudinally, thereby causing operation of cylinder valves to vary between cams 226 and 228 and/or other cams. In this way, CPS device 200 may switch between multiple cam profiles. While not shown, in hydraulic embodiments, a spool valve rather than a pin may physically communicate with the shuttle to effect axial movement of the shuttle.

The CPS device 200 may actuate the exhaust valve 202 between an open position allowing exhaust gas out of the valve port and a closed position substantially inhibiting gas from exiting from the valve port. In the present example, no-lift cam lobe 226 have a no-lift cam lobe profile for deactivating their respective cylinders based on engine operating conditions. Further, in the present example, lift cam lobe 228 have a lift cam lobe profile which is larger than the no-lift cam lobe profile, for opening the intake or exhaust valve.

The cam mechanism 282 may be positioned directly above the valve 202. Further, the cam lobes (226 and 228) may be slideably attached to the exhaust camshaft 70.

The cam tower 292 may be coupled to a cylinder head 210 of the engine. However, in other examples, the cam tower may be coupled to other components of an engine block, e.g., to a camshaft carrier or a cam cover. The cam tower may support the overhead camshafts and may separate the mechanisms positioned on the camshafts above the valve.

Additional elements not shown in FIG. 2 may include push rods, rocker arms, tappets, etc. Such devices and features may control actuation of the exhaust valve by converting rotational motion of the cams into translational motion of the valve.

The configuration of cams described above may be used to provide control of the amount and timing of air supplied to, and exhausted from, the cylinder 44. However, other configurations may be used to enable the CPS device 200 to switch valve control between two or more cams. For example, a switchable tappet or rocker arm may be used for varying valve control between two or more cams.

The CPS device 200 described above may be hydraulically powered, or electrically actuated, or combinations thereof. Signal lines can send control signals to and receive a cam timing and/or cam selection measurement from CPS device 200. The CPS device 200 may be the preferred CPS device for use in the cylinder 44, shown in FIG. 1, in one example.

Figure 3:
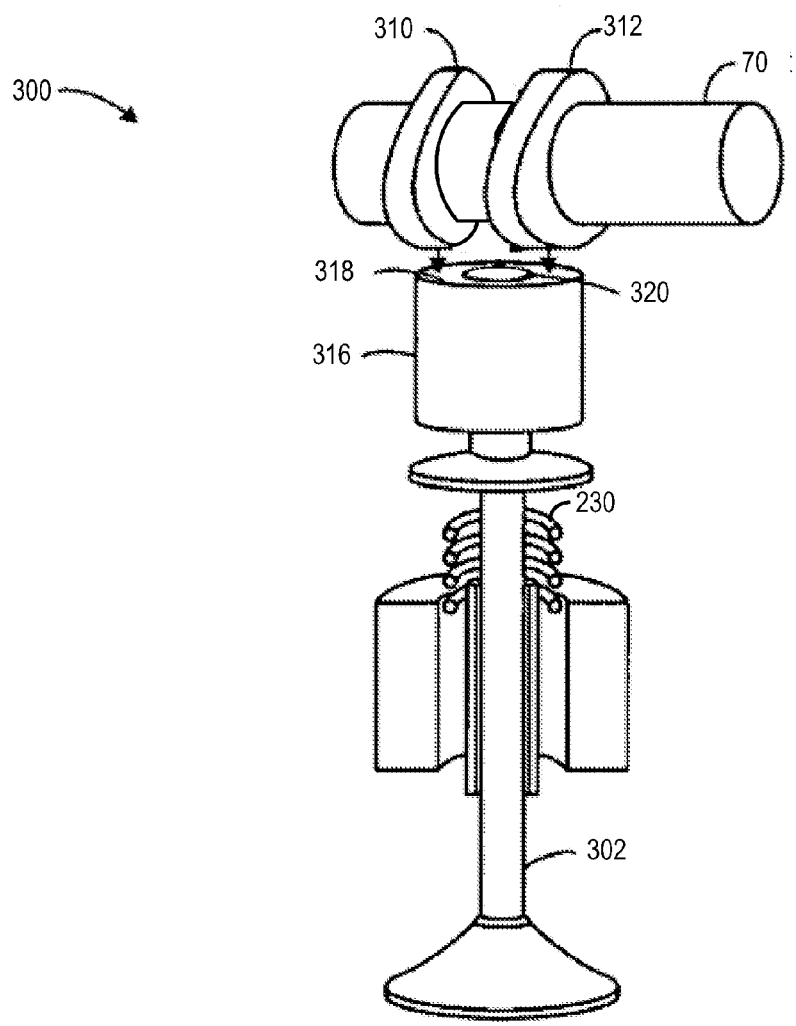
FIG. 3 shows another example exhaust valve and CPS device which may be included in the engine shown in FIG. 1.

Turning now to FIG. 3, another example CPS device 300 configuration for use with the engine 10, shown in FIG. 1, is depicted. The CPS device 300 is coupled to an exhaust valve 302. The CPS device 300 may be the first CPS device 76 and/or the second CPS device 78, shown in FIG. 1. Thus, in some examples, the first CPS device 76 and the second CPS device 78 device may be substantially identical. However, in other examples certain characteristics of the CPS devices may vary. For example, the cam profiles between CPS devices may vary. Thus, the cams in the CPS devices may have different profiles. Specifically, the cam associated with the exhaust valve in fluidic communication with the EGR conduit may have a more gradual lift profile to spread out the blow down pulse and provide a smooth EGR delivery, in one example. Additionally, the exhaust valve 302 may be the first exhaust valve 48 and/or the second exhaust valve 50, shown in FIG. 1.

Exhaust camshaft 70 may include cam lobes 310 and 312 defining a lift profile for the exhaust valve 302. Additionally, it will be appreciated that the cams in the first CPS device 76 shown in FIG. 1 may have a different profile than the cams in the second CPS device 78 shown in FIG. 1. In the depicted example, one cam lobe 310 would deactivate the valve for one CPS device while the other cam lobe 312 would prescribe the desired lift and duration for either the dedicated EGR path or the exhaust path. So, the CPS device would deactivate either the EGR or exhaust path exhaust valve while activating the exhaust or EGR path exhaust valve to the desired lift and duration.

In the depicted example, cam lobes 310 and 312 may have identical lift profiles. Further in some examples, a cam lobe may be positioned between the cam lobes 310 and 312. The cam lobe positioned between the cam lobes 310 and 312 may have a different lift profile than the cam lobes 310 and 312. In such an example, the cam lobe may have a lower lift profile than the cam lobes 310 and 312. Specifically, the low lift profile may not actuate the exhaust valve 302. However, in some examples the cam positioned between the cam lobes 310 and 312 may open the valve 302 slightly. In this way, the EGR rate may be decreased with some exhaust energy flowing to the turbine for higher boosted scenarios.

The switchable tappet 316 is configured to interact with multiple cam lobes of exhaust camshaft 70. In particular, cam lobes 310 and 312 may interact with an outer top surface of outer section 318 of switchable tappet 316. A central top surface of a central section 320 of the switchable tappet 316 does not interact with the cam lobes in the depicted example. However, in some examples a cam positioned between the cam lobes 310 and 312 may interact with the central section 320. The outer section 318 may be referred to as a first section and the central section may be referred to as a second section or vice-versa. In this way, the first section may enclose the second section. However, other section positioning has been contemplated. For example, the first section and the second section may be positioned side by side.

During valve operation, the switchable tappet 316 may be actuated as a unit by cam lobes 310 and 312 to generate a valve lift profile. Alternatively, outer section 318 may be decoupled from central section 320 as described in FIG. 3 and the switchable tappet 316 may not be actuated by cam lobes 310 and 312. Thus, when the central section 320 is decoupled from the outer section 318 via the CPS device 300 the exhaust valve 302 is not actuated. In this way, the CPS device 300 may be actuated to selectively activate and inhibit valve actuation. It will be appreciated that the CPS device 300 may be in electronic communication with the controller 12, shown in FIG. 1, as previously discussed.

While this example shows an overhead cam engine with a tappet coupled to the valve stems, tappets may also be used with a pushrod engine, and a collapsible tappet may thus be coupled to a pushrod.

FIG. 3 also shows a spring 330 coupled to the valve 302. The spring 330 may be configured to exert a return force on the valve 302 when the valve is in an open position. Further, it will be appreciated that the valve 302 may seat and seal on a valve seat of the cylinder 44, shown in FIG. 1, in a closed position. Likewise, in an open position the valve 302 may be spaced away from the valve seat.

Figure 4:
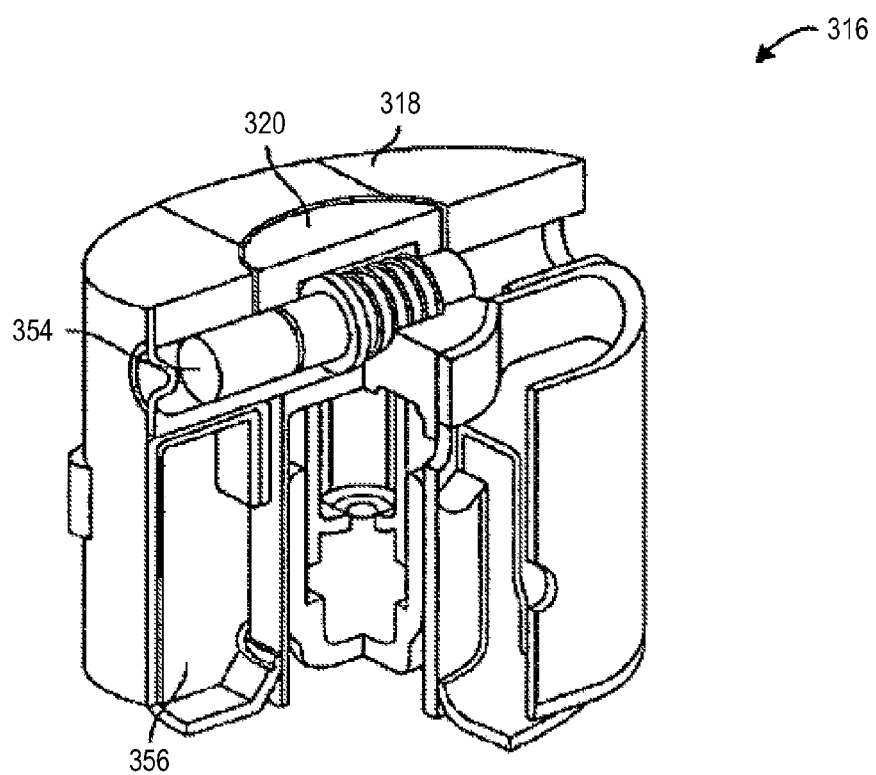
FIG. 4 shown an example tappet including in the CPS device shown in FIG. 3.

FIG. 4 shows one example of the switchable tappet 316 included in the CPS device 300, shown in FIG. 3, in which locking pin 354 is used to couple or decouple central section 320 from outer section 318. In this way, when the pin is in the locked position, the motion caused by contact with cam lobes 310 and 312, shown in FIG. 3, causes the inner portion to follow the motion and thus actuate the valve stem and valve coupled to the inner portion. Alternatively, when the pin is in the unlocked position, a lost motion spring in interior section 356 may cause outer section 318 to travel separately from central section 320. In the unlock position the outer section 318 may move up and down while the exhaust valve 302, shown in FIG. 3, remains substantially stationary. Therefore, in such a configuration the exhaust valve may be inhibited from actuation by the cam lobes 310 and 312, shown in FIG. 3. In this way, exhaust valve operation may be deactivated by the CPS device.

It will be appreciated that other examples of valve actuation may be used, if desired. For example, the switchable tappet may be actuated by a central cam in the unlocked position having a low lift profile.

In one example, pin 354 may be actuated via hydraulic pressure controlled via a hydraulic valve communicating with the controller 12, shown in FIG. 1, to transition the switchable tappet between the locked position and the unlocked position. Further, an oil circuit configuration may be implemented to control tappet switching of different cylinder valves.

Figure 5:
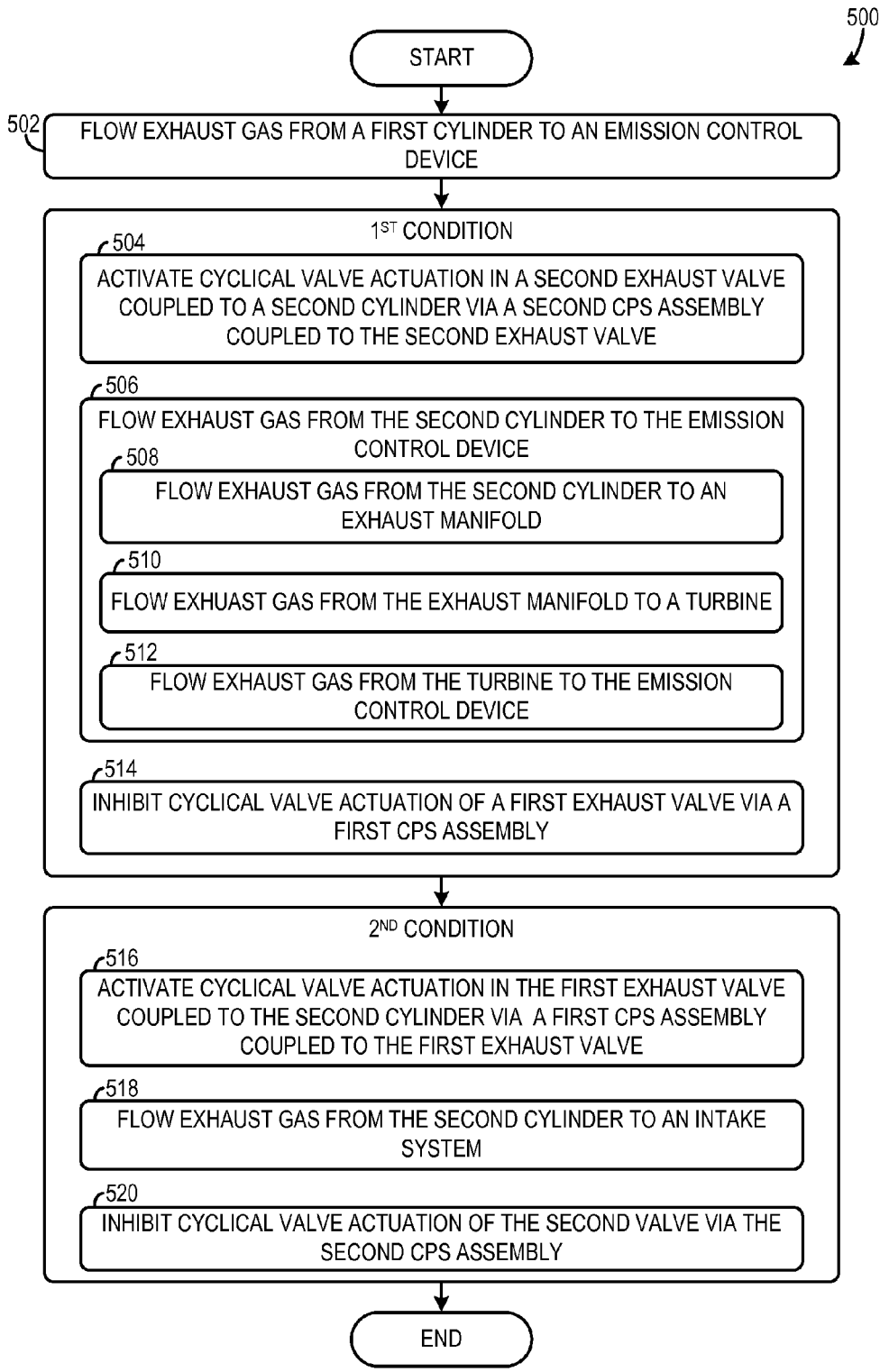

FIG. 5 shows a method 500 for operating an engine. The method 500 may be implemented by the engine and systems discussed above with regard to FIGS. 1-4 or may be implemented by another suitable engine and systems.

At 502 the method includes flowing exhaust gas from a first cylinder to an emission control device. Flowing exhaust gas from a first cylinder to an emission control device may include flowing exhaust gas from the first cylinder through a turbine positioned upstream of the emission control device.

Next at 504 the method includes activating cyclical valve actuation in a second exhaust valve coupled to a second cylinder via a second CPS assembly coupled to the first second exhaust valve. At 506 the method includes flowing exhaust gas from the second cylinder to the emission control device. Flowing exhaust gas from the second cylinder to the emission control device may include at 508 flowing exhaust gas from the second cylinder to an exhaust manifold, at 510 flowing exhaust gas from the exhaust manifold to a turbine, and at 512 flowing exhaust gas from the turbine to the emission control device.

At 514 the method includes inhibiting cyclical valve actuation of a first exhaust valve via a first CPS assembly. The first exhaust valve is coupled to the second cylinder and the first CPS assembly is coupled to the first exhaust valve. In this way, valve operation of the first exhaust valve is inhibited. In one example, the second exhaust valve is larger than the first exhaust valve. However, other exhaust valve sizes have been contemplated.

At 516 the method includes activating cyclical valve actuation in the second first exhaust valve coupled to the second cylinder via a first CPS assembly coupled to the first exhaust valve. Next at 518 the method includes flowing exhaust gas from the second cylinder to an intake system. When in this mode, the second cylinder may run in an alternative combustion mode (e.g., rich) to enhance combustion tolerance and effectiveness of the recirculated exhaust gases. At 520 the method includes inhibiting cyclical valve actuation of the second exhaust valve via the second CPS assembly. In this way, valve operation of the second exhaust valve is inhibited.

Steps 502, 504, 506, 508, 510, 512, and 514 may be implemented during a first condition. On the other hand steps 516, 518, and 520 may be implemented during a second condition. In one example, the first condition may be when an engine temperature is below a threshold value and the second condition may be when an engine temperature is greater than or equal to the threshold value. In this way, exhaust gas may be directed toward the emission control device for a fast warm-up and reduced emissions and then subsequently directed to the intake system for fuel economy benefits of EGR after the emission control device has reached a desired temperature. In another example, the first condition may be when an engine speed/load within an engine speed/load range or greater than an engine speed/load threshold value for improved boosted engine torque and horsepower and the second condition may be when an engine speed/load is not within the engine speed/load range or less than an engine speed/load threshold value. Still further in another example, the first condition may be when air/fuel ratio is above a threshold value and the second condition is when an air/fuel ratio is below a threshold value, such as rich of stoichiometric for enhanced combustion tolerance and effectiveness of recirculated exhaust gases.

Figure 6:
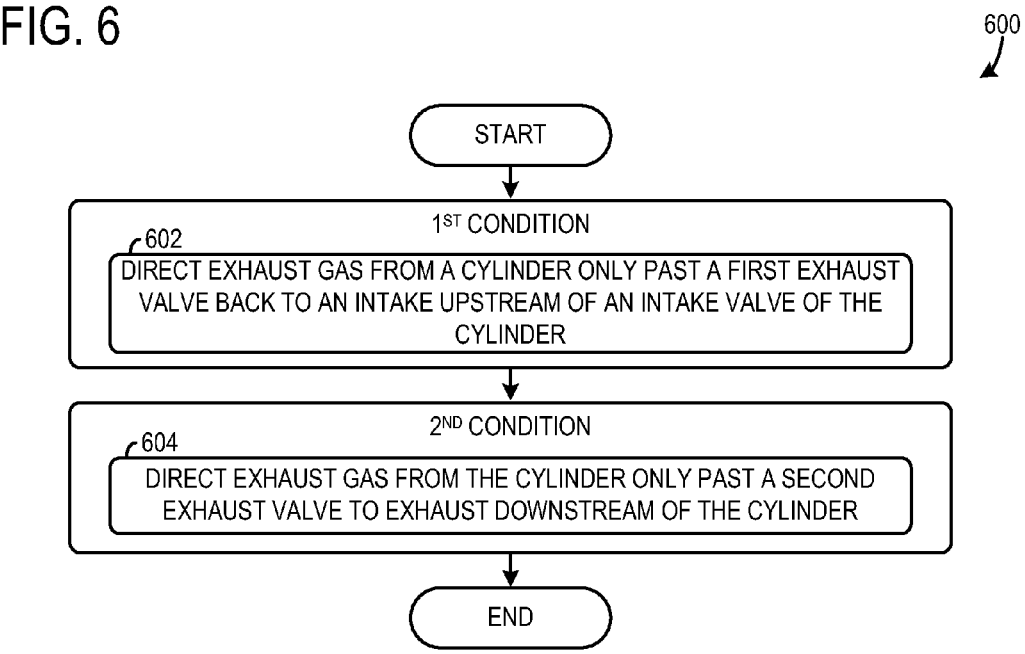

FIG. 6 shows a method 600 for operation of an engine. The method 600 may be implemented by the engine and systems discussed above with regard to FIGS. 1-4 or may be implemented by another suitable engine and systems.

At 602 the method includes directing exhaust gas from a cylinder only past a first exhaust valve back to an intake upstream of an intake valve of the cylinder. At 604 the method includes directing exhaust gas from the cylinder only past a second exhaust valve to exhaust downstream of the cylinder.

Step 602 may be implemented during a first condition and step 6 may be implemented during a second condition. In one example, the exhaust gas from the cylinder may be directed past only the second valve to merge with exhaust from another cylinder and the second condition may include cold engine starting and peak torque demand, the first condition exclusive from the second. In such an example, the exhaust gasses may merge upstream of a catalyst. Further in such an example, the exhaust gasses may merge downstream of a catalyst. Still further in such an example, the exhaust gasses may merge upstream of a turbocharger or the exhaust gasses may merge downstream of a turbocharger. Further in such an example, the exhaust gasses may merge into an exhaust manifold positioned within a cylinder head, in another example.

FIG. 7 shows a method 700 for operation of an engine. The method 700 may be implemented by the engine and systems discussed above with regard to FIGS. 1-4 or may be implemented by another suitable engine and systems.

At 702 the method includes directing a first amount of exhaust gas from a second exhaust valve to an emission control device and at 704 the method includes directing a second amount of exhaust gas from a first exhaust valve to an intake system. In some examples, the first amount of exhaust gas may not be equivalent to the second amount of exhaust gas.

It will be appreciated that steps 702 and 704 may be implemented at overlapping or in some cases concurrent time intervals. Additionally, steps 702 and 704 may be implemented during a first condition. The first condition may be when reduced exhaust gas recirculation is desired and the engine load is greater than a threshold value or within a load range that may be less than a peak boosted load.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine comprising:
    an exhaust gas recirculation (EGR) conduit in fluidic communication with a first exhaust valve in a cylinder and an intake system;
    an exhaust conduit in fluidic communication with a second exhaust valve in the cylinder and an emission control device;
    a first cam profile switching (CPS) device coupled to the first exhaust valve selectively activating valve operation;
    a second CPS device coupled to the second exhaust valve selectively activating valve operation; and
    a control system coupled to the first CPS device and the second CPS device, the control system configured to:
        during a first operating condition, activate cyclical actuation of the first exhaust valve to flow exhaust gas from the cylinder to the EGR conduit via the first CPS device; and
        during a second operating condition, activate cyclical actuation of the second exhaust valve to flow exhaust gas from the cylinder to the exhaust conduit via the second CPS device, where the EGR conduit and the exhaust conduit are fluidly separated;
        where the second exhaust valve is larger than the first exhaust valve, the engine further comprising a second cylinder including two or more exhaust valves in fluidic communication with the emission control device.

2. The engine of claim 1, where the first and second exhaust valves have different lift profiles when activated.

3. The engine of claim 1, further comprising a turbine positioned upstream of the emission control device, the exhaust conduit including an outlet positioned upstream of the turbine and the turbine coupled to a compressor in the intake system.

4. The engine of claim 1, where the EGR conduit does not include an EGR valve.

* * * * *